Feb. 27, 1968  F. M. LUCHT  3,370,560
SAILING VESSELS
Filed May 27, 1966  6 Sheets-Sheet 1
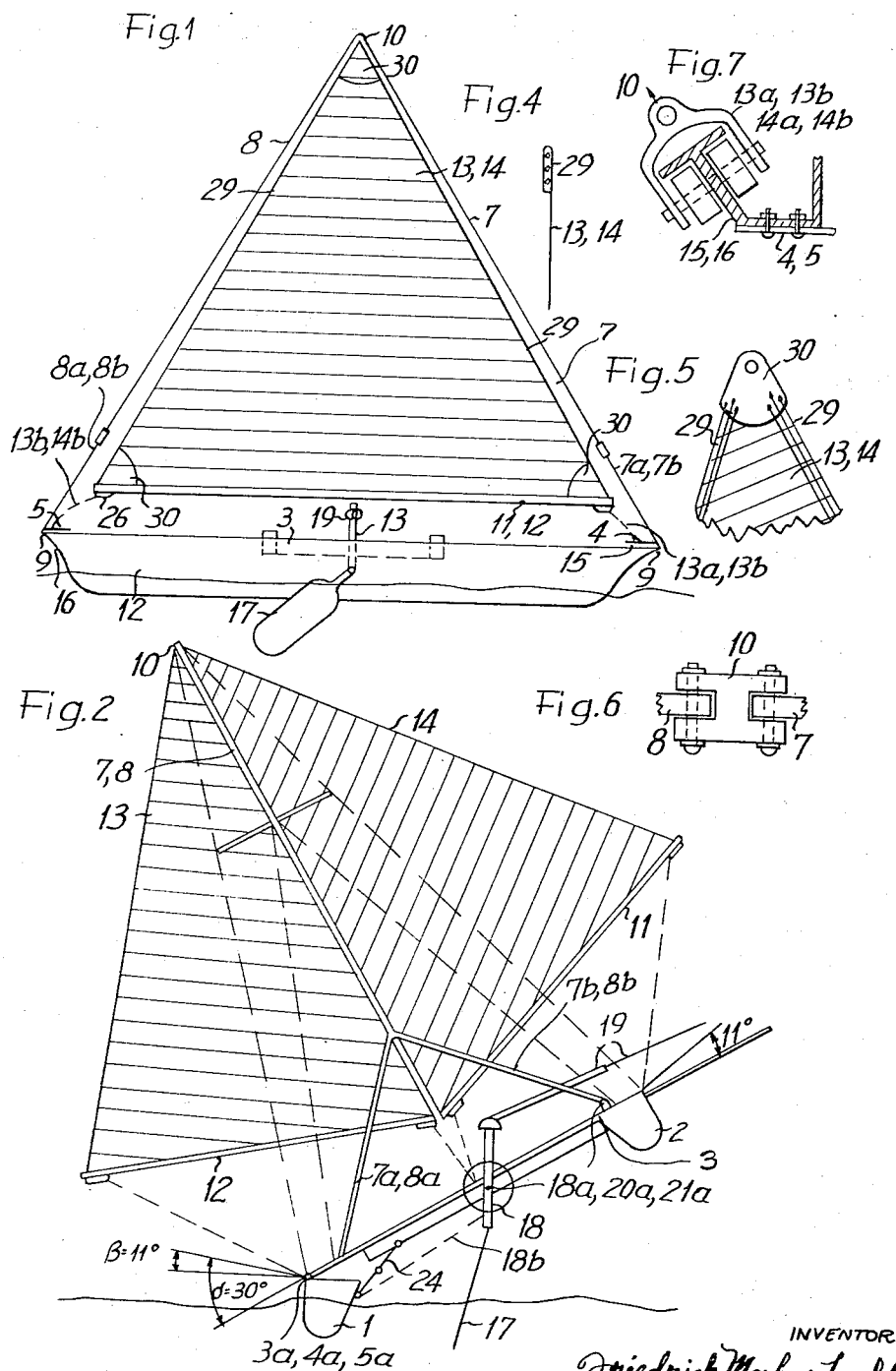
INVENTOR
Friedrich Markus Lucht
by Wolf, Greenfield & Hicken

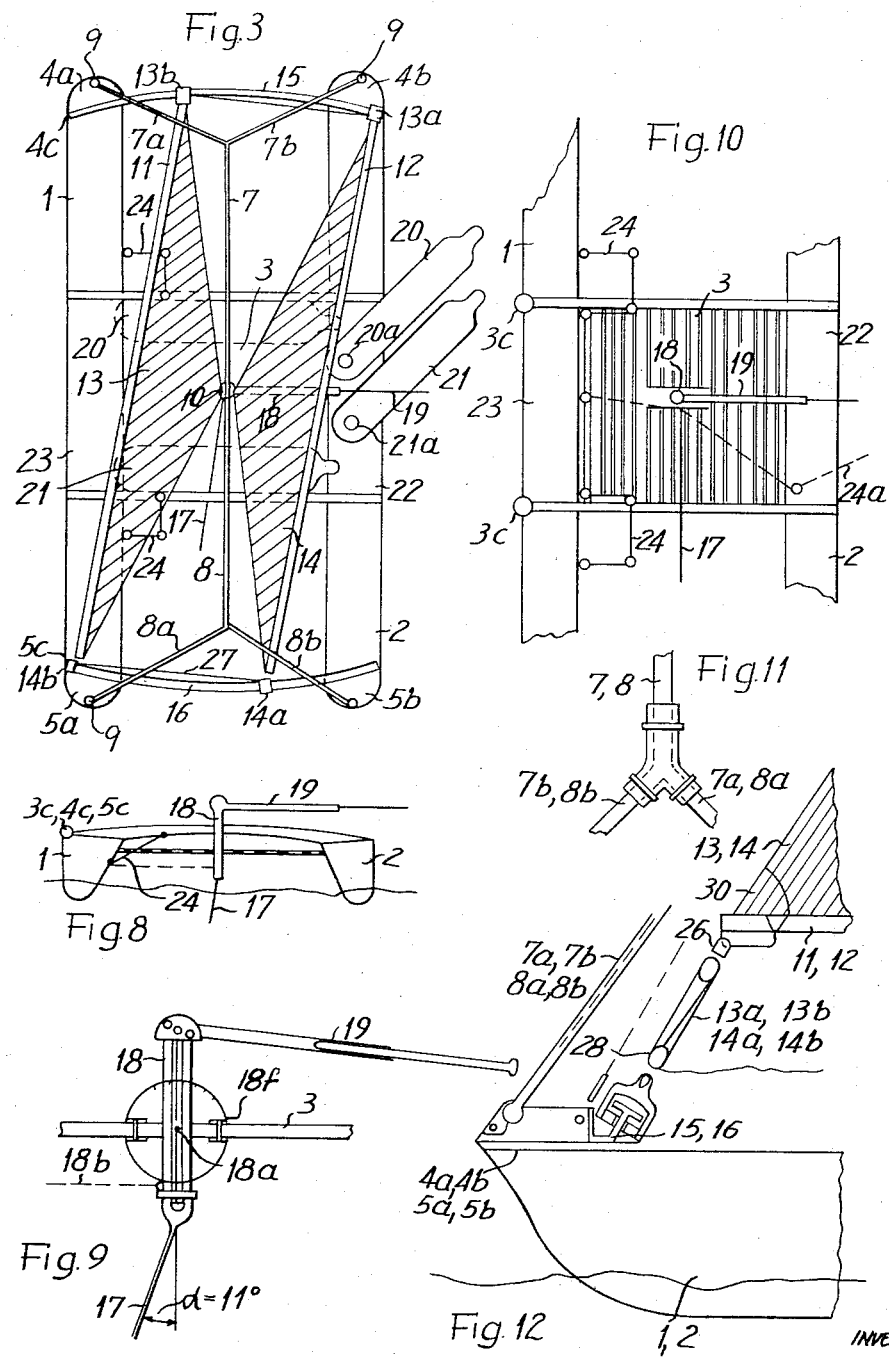

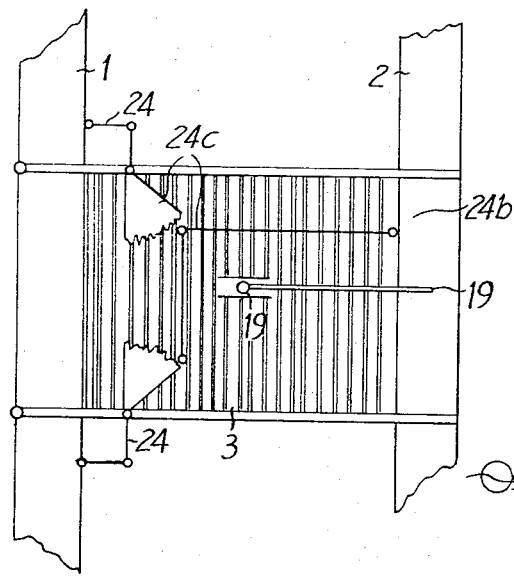
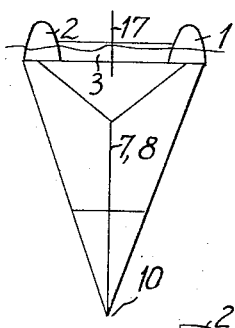
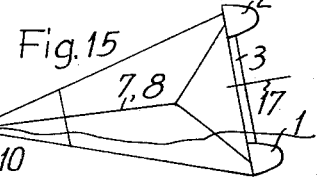
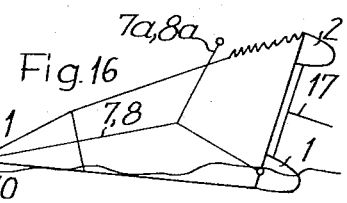
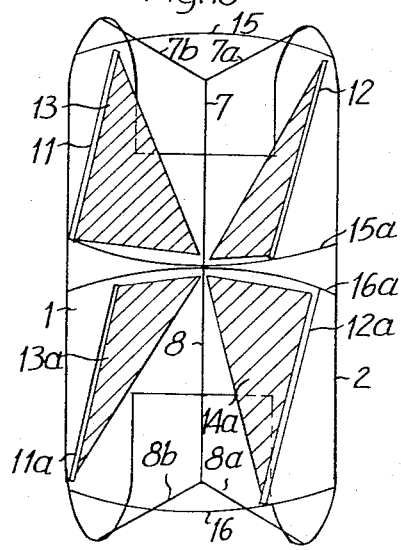
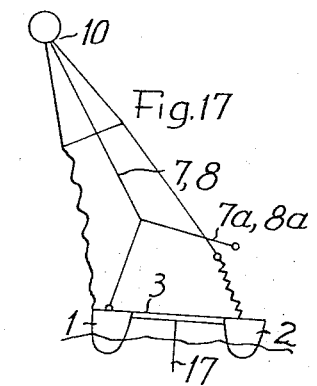

Feb. 27, 1968    F. M. LUCHT    3,370,560
SAILING VESSELS

Filed May 27, 1966    6 Sheets-Sheet 4

INVENTOR
Friedrich Markus Lucht
by Wolf, Greenfield & Hieken

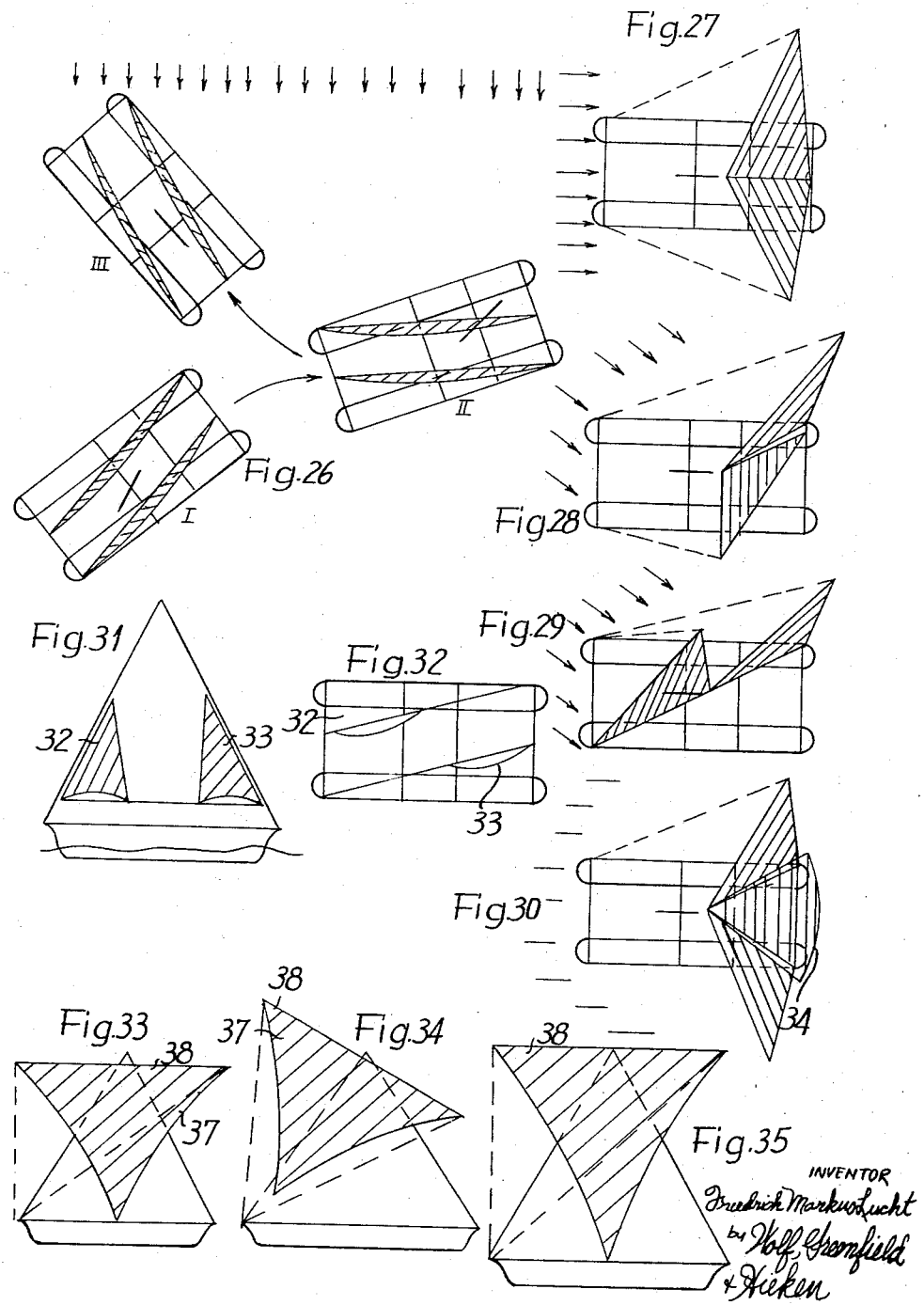

3,370,560
SAILING VESSELS
Friedrich Markus Lucht, 15 Hannastrasse,
285 Bremerhaven, Germany
Filed May 27, 1966, Ser. No. 553,569
Claims priority, application Germany, May 29, 1965,
L 50,817
10 Claims. (Cl. 114—39)

ABSTRACT OF THE DISCLOSURE

A sailing vessel is provided comprising a plurality of floats with each of the floats comprising two axially aligned ends constructed to facilitate movement of the floats in either direction along the axis. Means interconnect the floats and a rudder trunk is provided with a center board rudder blade mounted between the floats and depending downwardly from the trunk. Means mount the trunk for pivoting the trunk and the blade laterally of the vessel and means are provided for rotating the blade about a vertical axis of the trunk and for raising and lowering the blade in the water. The sailing vessel can have a plurality of parallel floats, skids or wheel carriers and may be referred to as a "cat" or catamaran.

---

These cats have undergone considerable development in the last few years and are now among the fastest sailing boats, being capable of attaining speeds of more than 25 knots. Cats of previous designs have the disadvantage that, although they attain high maximum speeds, they are too sluggish when tacking, because of their relatively great width. On account of their higher speed when sailing before the wind they cannot sail as close to the wind as a yawl, on going about they have to turn through the wind by an angle approximately 30° greater than the angle required by yawls, that is to say an angle of approximately 120°.

The present invention aims at providing a catamaran the sluggish behaviour of which on turning is no longer a disturbing feature. To this end the present invention consists in a sailing vehicle or cat having a plurality of parallel floats, skids, or wheel carriers, characterised in that it is equipped for sailing at choice in one direction or the reverse direction and for this purpose is in particular constructed with prows at both ends, which are preferably identically shaped. By virtue of such arrangement the cat of this invention need not turn through the wind, but is stopped and re-directed for sailing in the opposite direction by altering the position of the sails and operating the rudder. Since the ability to turn is no longer of such great importance in a boat of this type, there is no obstacle to building extremely broad cats with widely spaced floats and thus achieving still greater stability and consequently higher speed than known with conventional cats.

Because of sailing with alternating prows, the steering gear must be of such a type as to work equally well in both directions. Hitherto cats have had a rudder blade on the stern of each of the floats, while in the center each float also carried its own center board blade. A cat according to this invention can now be equipped with rudders at both ends, which can be brought alternately into the working position. According to a feature of the invention a constructionally and operationally simpler construction can be obtained by providing the boat with a rudder blade situated in the middle and also adapted at the same time to serve as center board, while by pivoting through 180° it can be changed over to either direction of travel. A single rudder trunk situated in the center of the boat and pivotable through approximately 45° laterally is preferably provided. In this manner it is possible for a unitary, one-piece rudder and center board blade to be placed vertically in the water at any inclination or list. Furthermore, the center board and rudder blade may be arranged to be adjustable in height. The steering and center board functions can then be achieved with optimum small hydrodynamic resistances.

The cat according to the invention has the particular feature that stem and stern change over when crossing at the turning points. When these turns are made the windward side thus always remains the same. Expressions such as starboard and port should therefore no longer be used for the new vessel. Some new expressions must therefore be coined for the new boat:

Since during sailing the crew generally remains on the windward side boat or float, the latter accordingly is called the "crew boat" or float and the side is called the "crew side." On the other hand the lee boat, or float, which at high speed is practically the only part which bears in the water, is referred to as "speed boat" or float and this side is called the "speed side." Other common expressions, such as prow, stern, sheets, and tacks, will still be retained in the following description.

The fact that the crew boat or float is always situated on the windward side provides the advantage that certain devices necessary or convenient for the new boat need be provided only on the crew boat. Thus, only the crew boat needs the fastening device for blocking the rudder trunk, and it is only on this boat or float that a slip device is required for slacking away the masts in the event of capsizing, as will be described more fully below.

The crew boat is preferably provided with balance rests, which are pivotable about axes perpendicular to the reclining surface of the float. The axis bolts of these balance rests may be adapted for the fastening of safety belts. The balance rests are advantageously fastened as benches in the cuddy, from wash board to wash board.

In order to be able to use the wind for maximum speed of travel even with increasing wind force, according to the invention both boats, that is to say the speed float and the crew float, are adjusted at an angle of approximately 11° to the boat bridge. Experience has shown that when a cat is tilted by 10 to 12° the windward side float is out of the water. At this point a cat has its maximum stability and achieves its highest speed. It is therefore advantageous for the angle at which the floats are fastened to the boat bridge to be selected so that the speed boat lies in the water without tilt at full speed.

In order to permit straight sailing of the speed boat even with a large list, the angle at which the speed boat is set in relation to the deck may be adjustable. Adjustment can be made from the balance rest of the crew boat by means of pull ropes with the aid of bent arms or through an axiometer line and bent arms.

The device for varying the angle of adjustment of the speed boat may be coupled with the device for varying the angular adjustment of the rudder trunk, the lower part of the latter being, for example connected by a line to a side wall of the speed boat.

In the case of the center board rudder blade it is also convenient for the latter to be bent by approximately 11° at its upper portion, so that in the optimum position of the boat for maximum speed the blade lies vertically in the water without adjustment.

In addition, it is important that the cat of this invention should be provided with rigging corresponding to its particular constructional and sailing features. Accordingly to another feature of the invention this can be achieved in a particularly advantageous manner if the rigging comprises two masts inclined in relation to one another and connected together at the top, while one or more fore-and-aft sails are connected between their common head and one or two booms running free between the masts. The masts are preferably positioned in a plane intermediate the speed float and crew float and have lower extensions mounted on said floats. This rigging provides the advantage that as compared with the usual sails provided on catamarans at least twice the sail area can be put on. At the same time the fore-and-aft sails can be handled reliably and easily during changing or reversing direction. Easy one-hand sailing is also possible with a fore-and-aft sail. In contrast to normal rigging, no disturbing mast is situated amidships. Since turning through the wind is now no longer necessary, a conventional boom is also not a disturbing feature when changing direction. Moreover, the crew do not change their places during the change of prow. Another advantage consists of the better trimming of the sails by stiffened tacks and sheets, and there is good and safe working on parts of the boat and rails outside the cuddy.

The new rigging offers many possibilities for adjusting the fore-and-aft sails, and wind disturbance through the mast, stays, bolt ropes, and falls is reduced.

The two masts are advantageously provided with legs spread out transversely of the vessel. The two masts may be articulated together by a hinge lying transversely of the vessel. The mast feet are preferably held in the form of balls in corresponding bearings in deck boards and may be easily detachable from their bearings.

For directing the fore-and-aft sails the foot pulling points of sheets and tacks may run on slide rails, in the form of arcs of a circle, between the two boats, said slide rails advantageously being mounted on inner edges, shaped as arcs of a circle, of the outer deck boards.

The new rigging provides moreover the important advantage that the bolt ropes run free and consequently hardly any wind shade can be perceived on the sail area from rigging parts lying on the windward side. In order further to increase this advantageous effect, the vertical bolt ropes of the fore-and-aft sails may consist of wires, namely advantageously of a plurality of wires lying side by side in the plane of the sail.

A still more favorable attack edge is achieved by making the sails of light metal foil.

In order to permit the vessel to be righted again in the event of capsizing, despite the great width of the boat, a balloon, adapted to be inflated on capsizing, may be mounted at the tip of the mast, preferably above the mast head hinge, for the inflation of which a gas cylinder connected thereto advantageously comes automatically into action on immersion in water.

In order that the invention may be more readily understood, reference is made to the accompanying drawings which illustrate diagrammatically and by way of example, several embodiments thereof, and in which:

FIGURE 1 is a side elevation of a catamaran having horizontal booms,

FIGURE 2 is a front view with the boat listing and with booms swung out,

FIGURE 3 is a plan view corresponding to FIGURE 1,

FIGURE 4 shows a sail bolt rope in cross-section,

FIGURE 5 shows an end fastening for bolt ropes,

FIGURE 6 shows the top hinge of a double mast,

FIGURE 7 shows a guide of the foot pull points of sheets and tacks,

Figure 19:
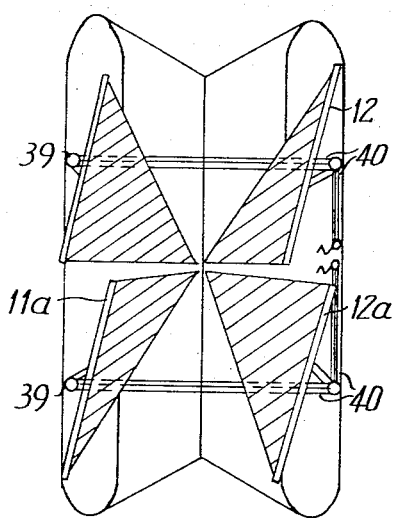
Figure 20:
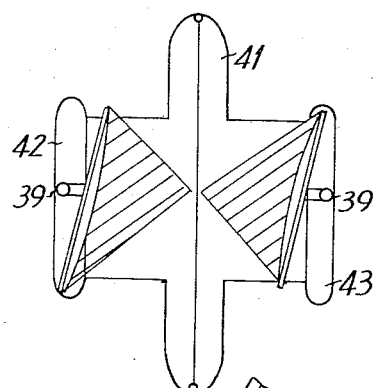
Figure 21:
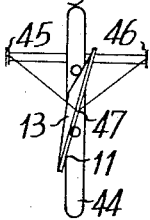
Figure 22:
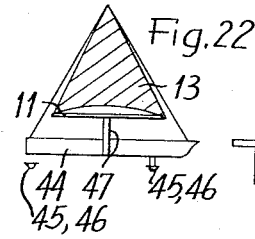
Figure 24:
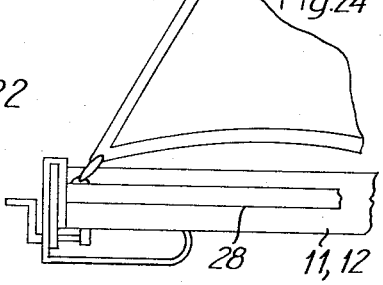
Figure 23:
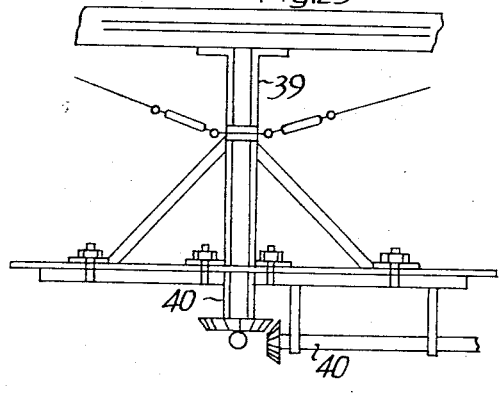
Figure 25:
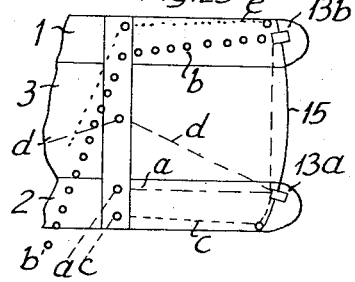
Figure 36:
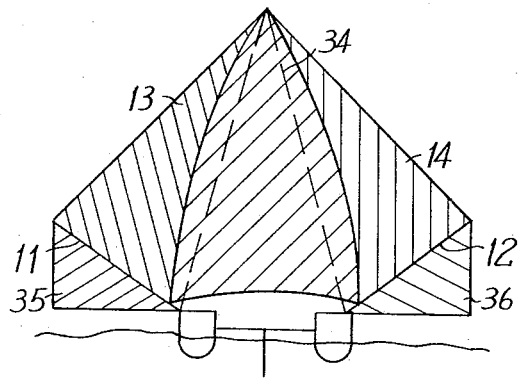

FIGURE 8 is a cross-section through the center of the boat with the rudder arrangement, FIGURE 9 shows the construction of the steering gear to a larger scale, FIGURE 10 is a plan view of the bridge deck, with a device for adjusting the speed boat fastening angle in a first embodiment, FIGURE 11 is a partial view of the masts with their stay legs, FIGURE 12 is a partial side elevation of a boat prow with rigging and mast, FIGURE 13 is a plan view of the bridge deck with a device for adjusting the boat fastening angle, in a second embodiment, FIGURES 14, 15, 16 and 17 show the operations in event of capsizing and slipping of the masts with the capsizing balloon, FIGURE 18 is a plan view of a deep sea cat with smaller sails, FIGURE 19 is a modification of the embodiment illustrated in FIGURE 18, FIGURE 20 is a trimaran according to the invention, in plan view, FIGURE 21 is an ice or beach sailing vessel, in plan view, FIGURE 22 is a side elevation corresponding to FIGURE 21, FIGURE 23 shows a device for use on sailing vessels according to FIGURES 19 to 22, FIGURE 24 shows a device for holding and winding up light metal sails, FIGURE 25 shows the running ropes for the catamaran illustrated in FIGURES 1 to 3, shown in plan view, FIGURE 26 is a plan view relating to the operation of changing direction of travel, and FIGURES 27 to 36 show various sail positions and sail arrangements.

The catamaran illustrated in FIGURES 1 to 3 is a sailing vessel having two floats 1 and 2 arranged in parallel relationship. In order to simplify the drawings where an identical element lies directly behind another shown numerals for both elements are indicated in the figures. These floats are in the form of narrow wooden or plastic boats, which are connected together in the center by a bridge deck 3. The floats each have hydrodynamically shaped prows at their axially aligned ends.

The catamaran is adapted for selective travel in one direction or the other. For this purpose the floats 1 and 2 are shaped as prows at both ends. Furthermore, the boat has a steering device similarly utilisable for both directions of travel and described more fully below.

The two floats 1 and 2 are provided at their ends with individual deck boards 4a, 4b and 5a, 5b.

The rigging of the catamaran consists of two masts 7, 8 which are inclined in relation to one another and joined together at the top 10. Two fore-and-aft sails 13, 14 are disposed between the joint top 10 and two booms 11, 12 extending on either side of the masts. The masts 7, 8 are provided with legs 7a, 7b and 8a, 8b spread out transversely of the vessel. Each of the mast feet 9 are constructed as balls and held in corresponding bearings in the deck boards 4a, 4b and 5a, 5b. They are mounted in conventional releasable bearings (FIG. 7) so that they can be easily detached.

Foot pulling points 13a, 14a and 13b, 14b (FIG. 3) of sheets and tacks a, b (FIG. 25) are guided on slide rails 15, 16 shaped as arcs of a circle and are adjusted and secured by bull ropes c, d, e preferably having ends passing to the bridge deck for control by the crew. The slide rails 15, 16 are mounted on inner edges, constructed in the form of arcs of a circle, of the deck boards 4a, 4b and 5a, 5b as best seen in FIG. 3.

Both floats, that is the speed float 1 and the crew float 2 are attached to the boat bridge 3 or to the deck boards 4a, 4b and 5a, 5b at an angle α of approximately 11°. Furthermore, the angle of attachment δ of the speed boat 1 to the deck is adjustable. The adjustment of the speed boat 1 is effected an outside hinge 3a and through bent arms 24. The bent arms 24 can be conventional center hinged folding arms of the type used to support a cover pivotable at a side along an arcuate path. The arms 24 are operated by a pull line 24a (FIG. 10) or by a crank 24b through an axiometer line 24c (FIG. 13).

Any conventional means can be employed to tilt the speed float with respect to the bridge and crew float.

The rudder equipment comprises a single center board rudder blade 17 which beneath the rudder trunk 18 is bent towards the speed side in relation to the deck to an extent of approximately 11°, in accordance with the fixed attachment angle α of the boats.

The center board rudder blade 17 can be lowered and raised in both directions of travel, and for the purpose of adjustment to both the directions of travel is rotatable over the entire horizon in the lowered position. For example, the trunk 18 can be rotated about the central axis by sliding bearings 18f in the deck 3. If contact is made with the seabed, the center board rudder blade is automatically pressed upwards. The trunk 18 is preferably mounted in a sliding guideway as semi-diagrammatically illustrated in FIG. 9 to permit raising and lowering thereof.

In order that the center board rudder blade 17 may be placed as upright as possible in the water even during listing, the rudder trunk 18 is pivotally mounted about a pivot 18a.

Both the foresheet man and the helmsman may move outboard. For this purpose balance rests 20, 21, FIG. 3, are provided, which are pivotable about axes 20a, 21a perpendicular to the reclining surface. The axis bolts 20a, 21a carry hooks or other means for the fastening of safety belts. The balance rests 20, 21 may be fastened as benches in the cuddy from wash board 22 to wash board 23.

In order to enable the rudder to be operated from the balance rest of the helmsman, the rudder is provided with a telescopically extensible rudder tiller 19.

The bottom part of the rudder trunk 18 is connected by a line 18b (FIG. 2) to the side wall of the speed boat 1, so that simultaneously with the adjustment of the rudder trunk 18 to tilt its axis with respect to the plane of the deck or boat bridge the angle of attachment δ of the speed boat 1 is also varied.

On variation of the angle of attachment δ of the speed boat, the deck parts 3, 4a, 4b and 5a, 5b are articulated to the speed side of the speed boat 1 by means of hinges 3c, 4c, 5c (FIG. 8) which are exactly in alignment with one another.

Foot pull points 13a, 13b, 14a, 14b are constructed as rollers which run on the rails 15 and 16 and are connected by tackle to the boom ends 26 (FIG. 12) which are constructed as slides.

The two sail booms 11, 12 can be kept at a predetermined distance apart by preferably rigid diverter rods 27 (FIG. 3) shackled between the rollers 13a, 14a and 13b, and 14b.

Conventional self-locking blocks are mounted in the sheet and tack tackle.

While the bottom bolt ropes of the fore-and-aft sails 13, 14 lie in grooves in the sail booms 11, 12, the vertical bolt ropes 29 (FIGS. 1 and 5) of the fore-and-aft sails triced up without stays consist of a plurality of wires sewn-in and lying side by side in the plane of the sail. The ends of the vertical bolt ropes 29 may be held in head, sheet horn, and tack metal plates 30 of the sails.

A balloon 31 (FIG. 16), which is inflatable in the event of capsizing, is provided at the mast tip, preferably above the mast top hinge 10, and is connected to a gas cylinder (not shown) and a conventional inflating device coming into action automatically when immersed in water.

As illustrated in FIGURES 31 and 32, storm sails 32, 33 can be set on opposite end portions of the booms, and can there occupy a larger or smaller triangular portion of the normal fore-and-aft sail area.

If the sails are made of light metal foil, they are advantageously wound on a rotatable rod 28 (FIG. 24) inside hollow booms. Guide rollers for the light metal sail are advantageously provided on both ends of the insertion slot in the boom.

In the case of high sea cats it is not necessary to take the numerous safety precautions required for a racing cat, because high sea cats owing to their greater water displacement never list to such an extent that the windward side float lifts out of the water. In the high sea cat illustrated in FIGURE 36 a spinnaker 34 is provided, which is to be triced between the two fore-and-aft sails 11, 12 aft of the mast and the sheets of which are guided astern below the booms 11, 12 by way of guide blocks, after both tack rollers have been pulled to blocks at their sides and the booms have been swung out to both sides and the sheets have also been lowered out. Moreover a water sail 35 and 36 respectively can then be set under each of the booms 11 and 12 swung out to both sides, said water sails being hauled on rails to the sheet derrick and boomed out by means of spars.

Finally, as illustrated in FIGURES 33 to 35, a triangular sail 37 having a yard 38 to be triced to a point below the top hinge 10, and if desired formed by the fore-and-aft sail booms lashed together, may be provided, the sheet of which sail is laid over a foot block on deck and which is to be directed from the after body by means of two braces fastened on the yard derrick.

FIGURE 18 shows a high sea cat which is provided with two rail groups 15, 15a and 16, 16a for guiding the foot pull points of, for example four handy fore-and-aft sails 13, 13a, 14, 14a with their booms 11, 11a, 12, 12a.

The four booms 11, 11a, 12, 12a of the four fore-and-aft sails of the high sea cat may also, as illustrated in FIGURES 19 and 23, be held by boom carriers 39 standing on deck and directed in pairs or individually by means of axiometer lines 40.

FIGURE 20 shows a trimaran having a central float 41 and two outside floats 42, 43 which, as illustrated in FIGURE 19, is provided with two boom carriers 39.

FIGURES 21 and 22 illustrate an ice sailing vessel or beach sailing vessel having a central body 44 and side skids or wheels 45, 46 with a fore-and-aft sail 13 and an adjustable boom 11 held by a boom carrier 47.

Within the scope of the invention many modifications and other constructions are possible, and in particular the invention may be similarly applied to sailing vessels of other types, such as for example trimarans, or ice and beach sailing vehicles. Moreover, the new rigging is also advantageously applicable to sailing vessels of otherwise conventional construction, and particularly to those having only one direction of sailing. Stayless sails of light metal foils may similarly also be used in sailing vessels of other types. The term "floats" as used throughout the claims and specification is equivalent to conventional skids and wheel-carriers common on cat-type vessels.

What is claimed is:

1. A sailing vessel comprising a plurality of floats, each of said floats comprising two axially aligned ends constructed to facilitate movement of said floats in either direction along said axis, means interconnecting said floats, a rudder trunk, a center board rudder blade mounted between said floats and depending downwardly from said trunk, means mounting said trunk for pivoting said trunk and blade laterally of said vessel, means for rotating said blade about a vertical axis of said trunk and for raising and lowering said blade in the water, two masts positioned above said floats and inclined with respect to each other and connected together at a common head, at least one sail mounted between said masts, at least one free running boom attached to said sail, each of said masts carrying lower legs with the leg of each mast diverting downwardly and outwardly from the leg of each other mast, each of said legs having a lower end mounted on one of said floats.

2. A sailing vessel in accordance with claim 1 wherein said boom has a first end and a second end,
   each of said boom ends being mounted by means for causing movement transversely of said vessel,
   said boom movement means comprising arcuate guide rails mounted across said floats,
   and roller means carried by said ends of said boom interengaging said guide rails.

3. A sailing vessel as set forth in claim 1 wherein said means interconnecting said floats comprises a boat bridge deck defining a first plane,
   said plurality of floats comprising a crew float and a substantially identical speed float each having top surfaces defining a second plane,
   said crew float and speed float being attached to said boat bridge deck at an angle of about 11° with said first plane of said bridge deck.

4. A sailing vessel in accordance with claim 3 wherein means are provided for varying the angle at which said speed float is attached to said boat bridge.

5. A sailing vessel in accordance with claim 4 wherein means are provided for simultaneously changing the angular attachment of said speed float and varying the lateral position of said rudder.

6. A sailing vessel in accordance with claim 1 wherein said blade defines a plane lying at an angle of about 11° with the axis of said trunk.

7. A sailing vessel in accordance with claim 2 wherein said sail carries upwardly extending bolt ropes,
   said ropes having incorporated therein axially extending wires.

8. A sailing vessel in accordance with claim 2 wherein said sail carries a plurality of bolt ropes comprising wires lying side by side in the plane of the sail,
   ends of said rope bolts being mounted in head, sheet, horn and tack metal plates provided on said sail.

9. A sailing vessel in accordance with claim 2 and further comprising,
   an inflatable means mounted at said head,
   said inflatable means being automatically actuated to provide buoyancy upon overturning of said vessel and exposure to a body of water to thereby aid in righting said vessel.

10. A sailing vessel in accordance with claim 2 wherein said sail is composed of metal foil,
    and means in said boom for winding and storing said sail therein.

References Cited

UNITED STATES PATENTS

| 2,653,563 | 9/1953 | Long | 114—39 |
| 3,086,492 | 4/1963 | Holley | 115—28 |
| 3,173,395 | 3/1965 | Laurent | 114—39 |
| 3,223,065 | 12/1965 | Wilson | 114—39 |

FOREIGN PATENTS 996,103  6/1965  Great Britain.

MILTON BUCHLER, *Primary Examiner.*

T. M. BLIX, *Assistant Examiner.*